3,275,401
PROCESS FOR PREPARING FAST DYEINGS OR PRINTS ON CELLULOSE MATERIALS

Otto Fuchs, Frankfurt am Main, Reinhold Deubel, Kelkheim, Taunus, Alfred Brechlin, Frankfurt am Main, Hans Bühner, Kelkheim, Taunus, Erich Feess, Frankfurt am Main, and Hans Zimmermann, Hofheim, Taunus, Germany, assignors to Farbwerke Hoechst Aktiengesellschaft vormals Meister Lucius & Brüning, Frankfurt am Main, Germany, a corporation of Germany
No Drawing. Filed July 9, 1963, Ser. No. 293,869
Claims priority, application Germany, July 14, 1962, F 37,312
4 Claims. (Cl. 8—54.2)

It is known that cellulose materials can be dyed and printed with phthalocyanine dyestuffs containing quaternary ammonium, tertiary sulfonium or isothiuronium groups by applying the dyestuffs to the cellulose material in an aqueous solution in the presence of a weak acid and an alkali metal salt of a weak acid and subsequently fixing them by steaming or heating (British specification No. 633,160).

It is now been found that fast dyeings or prints can be prepared on cellulose materials by padding or printing on cellulose material water-soluble phthalocyanine dyestuffs of the formula

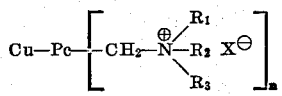

in which $R_1$, $R_2$ and $R_3$ represent equal or different lower alkyl or hydroxyalkyl groups, $X^\ominus$ represents the anion of an inorganic or organic acid, Pc represents a phthalocyanine radical and $n$ is a figure of 2 to 4, and by then fixing them on the fiber at an elevated temperature with a reducing agent in the presence of an agent having an alkaline reaction.

The simultaneous use of a reducing agent when fixing under alkaline conditions surprisingly causes a very great increase of the dyestuff yield on the fiber in comparison to dyeings which had been fixed with alkali only. It is evident that in the presence of the reducing agent the splitting of the dyestuff takes place more rapidly, and the dyestuff is fixed on the fiber more strongly. As reducing agents used in the process of the present invention there may be mentioned by way of example sodium hydrosulfite and the sodium salt of hydroxymethane-sulfinic acid.

The copper-phthalocyanine dyestuffs used in the process of the present invention may be prepared, for example, by reacting chloro- or bromo-methylated copper-phthalocyanines with tertiary amines.

In the process of the present invention the fixation of the phthalocyanine dyestuffs containing quaternary ammonium groups is generally carried out by treating the dyeings or prints prepared with these dyestuffs with a reducing agent in the presence of an agent having an alkaline reaction. Fast dyeings of high intensity can be prepared, for example, according to the two-bath-jig-padding process by padding the dyestuffs on the fiber and—after having dried the fibrous material on the jig—developing it in a liquor containing sodium hydroxide solution, sodium sulfate and sodium hydrosulfite.

Intense prints possessing good fastness properties can be prepared, for example, according to the two-phase printing process by printing the fibrous material with a printing paste containing the dyestuffs used in the process of the present invention, padding or nip-padding the dried prints with a solution containing a reducing agent and an agent having a alkaline reaction, and then steaming it.

The phthalocyanine dyestuffs used in the process of the present invention may also be used in admixture with vat dyestuffs or other dyestuffs suitable for the two-phase printing process. When mixing them, for example, with yellow dyestuffs, green shades of very great clearness and very good fastness properties are obtained.

The following examples serve to illustrate the invention, but they are not intended to limit it thereto, the parts being by weight unless otherwise stated and the relationship of parts by weight to parts by volume being the same as that of the kilogram to the liter.

Example 1

50 parts of a 20% paste of Indanthren Yellow 6GD (Colour Index, Second Edition, 1956, No. 56,080) are mixed with a solution of 30 parts of the dyestuff, obtainable by reacting copper-tri-(chloromethyl)-phthalocyanine with methyl-di-(hydroxyethyl)-amine, and 80 parts of urea in 240 parts of hot water. 600 parts of a 10% tragacanth-thickening are then added. The printing paste is printed on cotton in the usual manner and the print is dried. The goods are then padded on the padding machine with a padding liquor containing in 1000 parts by volume of liquor 70 parts of sodium hydrosulfite, 100 parts of sodium hydroxide solution of 38° Bé. and 50 parts of anhydrous sodium carbonate. Subsequently the goods are steamed for 20 minutes at 110° to 112° C. on a rapid ager. The goods are then rinsed, oxidized, as vat dyestuffs usually are, and after-treated by boiling them with a solution of 1 part of an ionic or a non-ionic synthetic detergent in 1000 parts of water, rinsed and dried. A clear green print of very good fastness properties is obtained.

The same results are obtained, when using for the above padding liquor instead of sodium hydrosulfite 60 parts of the sodium salt of hydroxymethane-sulfinic acid stabilized with acetaldehyde and an organic amine and steaming for about 30 to 40 seconds.

Example 2

Instead of the padding liquors indicated in Example 1 a liquor is used containing in 1000 parts of solution 100 parts of the sodium salt of hydroxymethane-sulfinic acid, 700 parts of water, 50 parts of potassium carbonate, 50 parts of sodium hydroxide solution of 38° Bé. and 100 parts of water. Immediately after padding, the goods are steamed for about 5 to 8 minutes and finished as described above.

Example 3

20 parts of the dyestuffs obtained by reacting copper-tri-(chloromethyl)-phthalocyanine with trimethylamine with 80 parts of urea in 250 parts of water are dissolved in the hot. A starch-tragacanth-thickening is then added and the whole is made up to 1000 parts by adding water or thickening. After printing on cotton fabric, the goods are dried and padded, steamed and finished as described in Example 1 for fixing the dyestuff. The oxidation may also be omitted. A very brilliant turquoise blue print of a very good fastness to light and very good properties of wet fastness is obtained.

Example 4

25 parts of the dyestuff described in Example 3 are dissolved in 1000 parts of water with the addition of 20 parts of acetic acid of 30% strength and padded on bleached mercerized cotton fabric with a squeezing effect of about 80%. After drying at 80° C., the goods are developed on the jig for 30 minutes at 90° C. in a liquor containing in 1000 parts of water 10 parts by volume of sodium hydroxide solution of 38° Bé., 50 parts of sodium sulfate and 5 parts of sodium hydrosulfite. After rinsing and soaping, a clear turquoise blue dyeing of very good fastness properties is obtained, the tint of which is many times deeper than that of a dyeing prepared in the absence of the reducing agent under otherwise analogous conditions.

We claim:
1. Process for preparing fast dyeings and prints on cellulose materials, which comprises applying on cellulose material a water-soluble phthalocyanine dyestuff of the formula

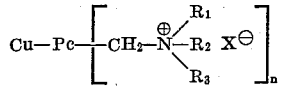

wherein $R_1$, $R_2$ and $R_3$ represent members of the group consisting of lower alkyl groups and hydroxy lower-alkyl groups, X stands for a member of the group consisting of chlorine and bromine, Pc stands for phthalocyanine and $n$ has a value of 2 to 4 and fixing the dyestuff on the fiber with a reducing agent in the presence of an agent having an alkaline reaction at raised temperature.

2. Process as claimed in claim 1, wherein a dyestuff of the formula

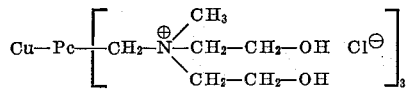

in which Pc has the meaning defined above, is used.

3. Process as claimed in claim 1, wherein a dyestuff of the formula

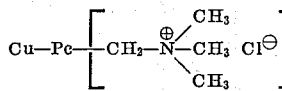

in which Pc has the meaning defined above, is used.

4. Process as defined in claim 1, wherein the reducing agent is sodium hydrosulfite or the sodium salt of hydroxymethane sulfinic acid.

References Cited by the Examiner

UNITED STATES PATENTS 3,088,790   5/1963   Schulthesis et al. _____ 8—54.2

FOREIGN PATENTS 633,160   12/1949   Great Britain.
925,768   5/1963   Great Britain.

NORMAN G. TORCHIN, *Primary Examiner.*

J. TRAVIS BROWN, *Examiner.*

J. HERBERT, *Assistant Examiner.*